US006909552B2

(12) United States Patent
Dohi et al.

(10) Patent No.: US 6,909,552 B2
(45) Date of Patent: Jun. 21, 2005

(54) THREE-DIMENSIONAL IMAGE CALCULATING METHOD, THREE-DIMENSIONAL IMAGE GENERATING METHOD AND THREE-DIMENSIONAL IMAGE DISPLAY DEVICE

(75) Inventors: Takeyoshi Dohi, Tokyo (JP); Makoto Iwahara, Yokohama (JP); Nobuhiko Hata, Tokyo (JP); Hongen Liao, Tokyo (JP); Yoichi Katayama, Tokyo (JP)

(73) Assignee: DHS, Ltd., Tokyo (JP)

( * ) Notice: Subject to any disclaimer, the term of this patent is extended or adjusted under 35 U.S.C. 154(b) by 0 days.

(21) Appl. No.: 10/808,170

(22) Filed: Mar. 23, 2004

(65) Prior Publication Data

US 2004/0190146 A1 Sep. 30, 2004

(30) Foreign Application Priority Data

Mar. 25, 2003 (JP) ........................................ 2003-082839

(51) Int. Cl.[7] .................. G02B 21/36; G02B 27/22; H04N 13/04; G06T 15/00
(52) U.S. Cl. ..................... 359/619; 359/363; 359/462; 359/463; 345/419; 345/427; 348/59

(58) Field of Search ................................. 359/363, 455, 359/462–464, 619; 348/50, 51, 54, 56, 59; 345/419–427, 4–9, 51, 32, 52

(56) References Cited

U.S. PATENT DOCUMENTS 6,798,390 B1 * 9/2004 Sudo et al. ................... 345/7

* cited by examiner

Primary Examiner—Hung X Dang
Assistant Examiner—Joseph Martinez
(74) Attorney, Agent, or Firm—Carella Byrne Bain Gilfillan Cecchi Stewart & Olstein (57) ABSTRACT

The present invention provides a three-dimensional image display device capable of reproducing clear, deviation-free and distortion-free three-dimensional images generated by a three-dimensional generating method. The three-dimensional image display device 4 comprises a lens array 1 having the predetermined number of convex lenses arranged in a matrix; and image display means for displaying a plurality of two-dimensional images 3 corresponding to the respective convex lenses. The same lens array 1 is employed in the three-dimensional display device as the lens array employed for generating the two-dimensional images.

5 Claims, 7 Drawing Sheets

THREE-DIMENSIONAL IMAGE CALCULATING METHOD, THREE-DIMENSIONAL IMAGE GENERATING METHOD AND THREE-DIMENSIONAL IMAGE DISPLAY DEVICE

FIELD OF THE INVENTION

The present invention relates to a three-dimensional image generating method and a three-dimensional image display device capable of displaying precise three-dimensional images of high resolution without receiving any influences from deviated or distorted lenses in a lens array.

BRIEF DESCRIPTION OF THE RELATED ART

A computer generated integral photography (CGIP) has been known as a method for viewing virtual three-dimensional objects without using special spectacles. (See for example, References 1 and 2)

Reference 1: PCT International publication Number WO00/59235 (which corresponds to U.S. Ser. No. 09/937,113)

Reference 2: Y. Igarashi, et al; "3-D display system using a computer generated integral photography", Japan J. Appl. Phys. Vol.17, pp.1683–1684, (1978)

The CGIP employs a lens array in which a plurality of small convex lenses arranged in a matrix. Image information consisting of a plurality of pixels is placed behind each lens of the lens array for reproducing a three dimensional image. The number of pixels behind each lens is determined by a desired resolution, for example, 10 by 10 pixels/lens, 100 by 100 pixels/lens and so forth. The image information for each lens to be placed behind the lens array is calculated by a computer and calculated image information is printed on a film or displayed on a liquid crystal display (LCD) or the like. When the printed or displayed image information is viewed through the lens array, a three-dimensional image with depth can be observed.

However, there are the following problems in the conventional CGIP.

The image information for each lens of the lens array is usually calculated based on condition that each lens of the lens array is precisely arranged as designed, but actually some of lenses of the lens array are deviated from designed positions. Each lens of the lens array has a short focal length of several millimeters so that a ray from an image arranged at the back (focal plane) of a lens are irradiated in a deviated direction by several degrees from a designed direction, when the lens is deviated by 0.1 mm from a designed position. If the ray is observed at a position 1 meter apart from the lens, the observed ray is deviated from the designed position by a large extent ranging from some ten millimeters to ca. 100 millimeters. If the ray is observed at a position further apart, the observed ray is much more deviated.

Figure 3:
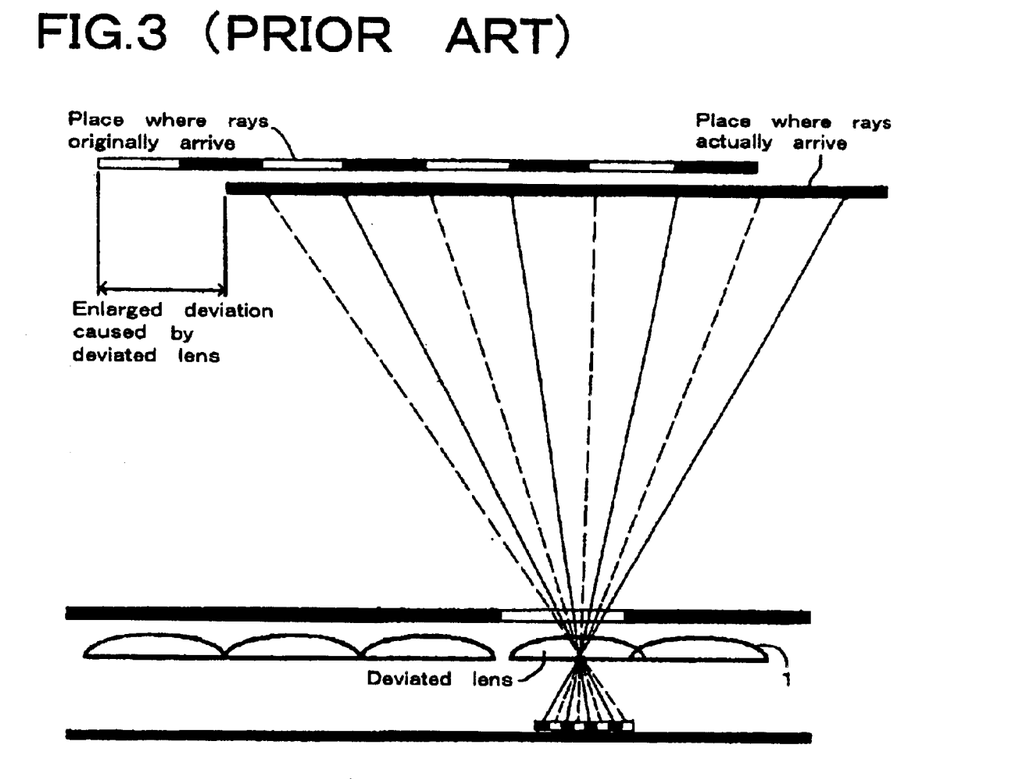
FIG. 3 is an explanatory diagram depicting a deviation in a reproduced image caused by a deviation of a convex lens by a conventional method.
Figure 4:
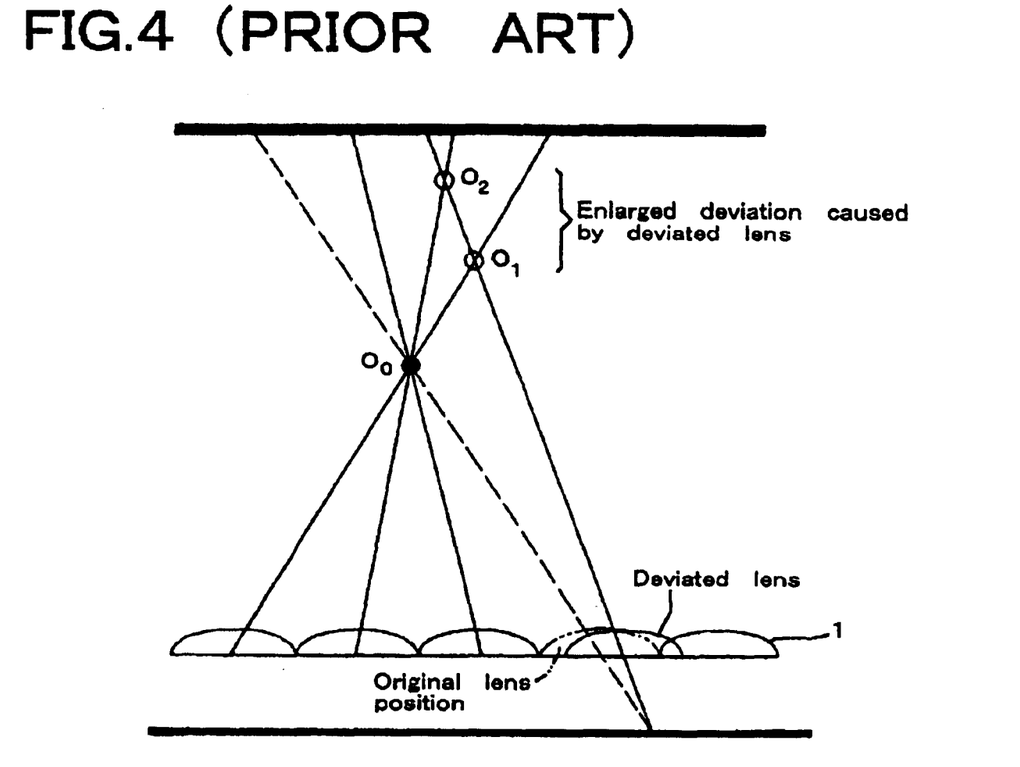
FIG. 4 is an explanatory diagram depicting a reproduced blurred image caused by the deviation of the convex lens by the conventional method.

It is essential to direct the ray to an observer as near as possible to the designed direction in order to reproduce a precise three-dimensional image. However, in a conventional reproducing method, even a small arranging error of the lens influences too much on the deviation of the ray at a position to be observed (see FIG. 3). The three-dimensional image is displayed as accumulated rays from a plurality of lenses, which are converged into a point so that an image $O_0$ is formed as shown in FIG. 4. When a lens arrangement in the lens array is deviated, images $O_1$ and $O_2$ at much deviated positions are also formed together with the image $O_0$, so that a combined reproduced image is blurred.

Simple plano-convex lenses are usually employed for respective lenses of the lens array. Even if some of the plano-convex lenses of the lens array are distorted (a square observed through such lenses shows a shape of a bobbin or barrel), the image information to be placed behind the lenses is usually calculated without considering influences of the distorted lenses. As a result, the distorted lenses influence on a three-dimensional image reproduced by the lens array such that the image is not reproduced at a precise position or it is blurred.

In order to reproduce a three-dimensional image precisely by utilizing the conventional lens array, a lens arrangement in the lens array and geometry of each lens should be made absolutely flawless, but actually it is very difficult to obtain such flawless lens array. When a lot of costs are spent, such flawless lens array will be obtained, but not practical.

SUMMARY OF THE INVENTION

The present invention is carried out in view of the above-mentioned problems in order to provide a three-dimensional image calculating method, a three-dimensional image generating method and a three-dimensional display device capable of displaying virtually deviation-free and distortion-free three-dimensional images. Totally perfect three-dimensional images can be obtained by the present invention by minimizing deviations of light rays in image observing areas (referential areas), although some lenses in a lens array deviated and/or distorted.

The three-dimensional image calculating method, the three-dimensional image generating method and the three-dimensional display device by the present invention are constituted as follows.

(1) A three-dimensional image calculating method for calculating a plurality of images utilized in a three-dimensional image display device which comprises: a lens array having the predetermined number of convex lenses arranged in a matrix; and image display means for displaying a plurality of images corresponding to the respective convex lenses, wherein the method consists of steps of: assuming a referential viewing distance wherefrom a reproduced three-dimensional image is viewed; dividing a viewing zone positioned at the referential viewing distance (a referential viewing area) into small areas arranged in another matrix; ray tracking along a line connecting the center of the small area with a base point of a selected convex lens; determining a first cross point of the line connected with the selected lens to surfaces of objects to be displayed as a three-dimensional image; calculating image information on the first cross point; repeating the calculating step on the whole convex lenses; and repeating steps from the ray tracking step to just prior step to the present step on respective the small areas.

(2) A three-dimensional image generating method for a three-dimensional image display device which comprises: a lens array having the predetermined number of convex lenses arranged in a matrix; image recording means behind respective convex lenses arranged nearly at the focal planes of the respective convex lenses; a two-dimensional display means ahead of the lens array arranged at a predetermined distance from the lens array; an optical window for reaching light rays from the two-dimensional display means to only one of plurality convex lenses; a light ray shielding means for not reaching light rays from the two-dimensional display means to other remaining convex lenses except one; an optical window moving means for holding the optical window and for moving the optical window two-dimensionally;

and a sequence controlling means to control images calculated by the method of (1) for transferring to the two-dimensional display means and to control movements of the optical window moving means, wherein the method consists of steps of: moving the optical window to a position corresponding to a determined convex lens by controlling the sequence controlling means and the optical window moving means; transferring a calculated image corresponding to the determined convex lens to the two-dimensional image display means; displaying the transferred image for a predetermined period; exposing the displayed image on the image recording means via the optical window and the convex lens determined by the optical window; repeating the above-mentioned series of steps on a next determined convex lens; and repeating the above-mentioned series of steps on the whole convex lenses of the lens array so as to complete the three-dimensional image.

(3) The three-dimensional image generating method according to (2), wherein: an optical shutter controlled by the sequence controlling means is added to the optical window, and an exposing time of the predetermined period is controlled by opening and shutting the shutter.

(4) A three-dimensional image display device comprising: a lens array having the predetermined number of convex lenses arranged in a matrix; and image display means for displaying a plurality of images calculated by the method of (1) corresponding to the respective the convex lenses, wherein: the lens array is the same lens array employed for generating images by the method of (1).

(5) The three-dimensional image generating method according to (2), wherein: the recording means is a photographic film.

DETAILED DESCRIPTION OF THE PREFERRED EMBODIMENTS

Hereinafter, embodiments by the present invention is explained as referring to drawings.

Figure 1:
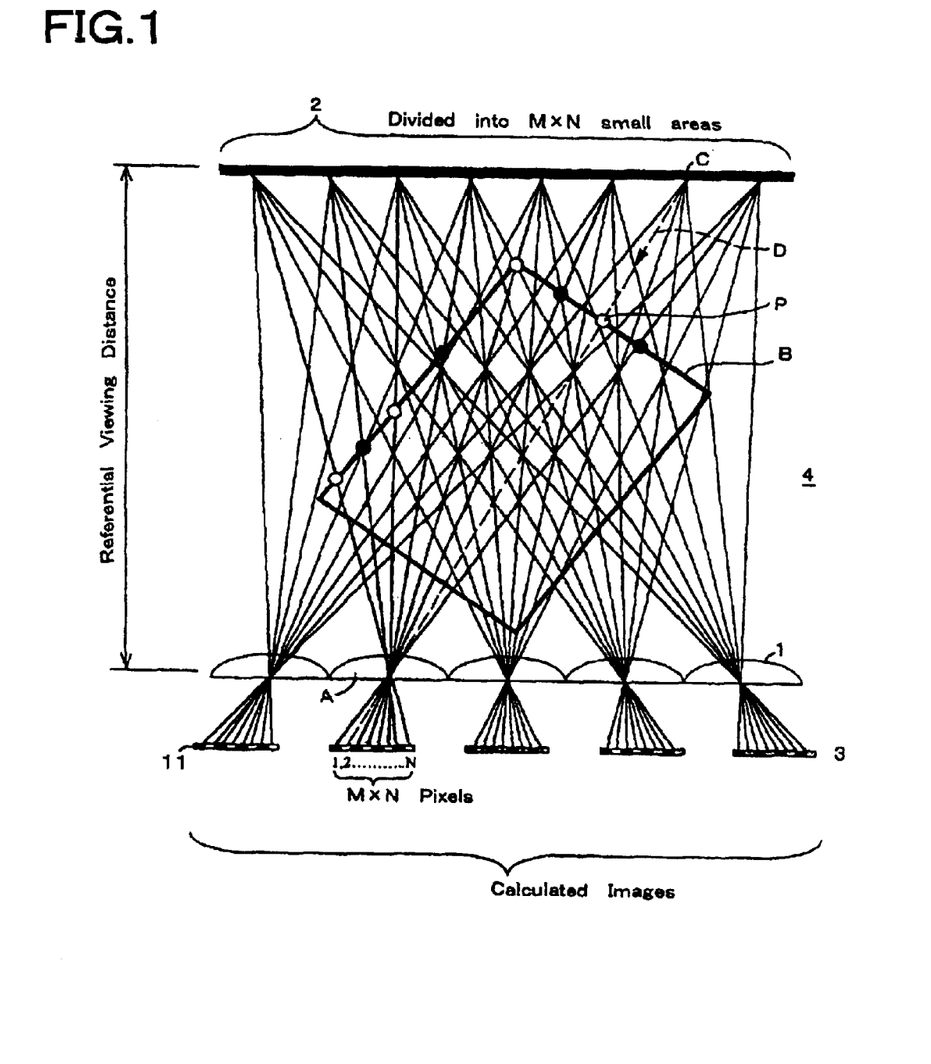
FIG. 1 is an explanatory diagram depicting a ray tracking method for generating a three-dimensional image by the present invention.

FIG. 1 shows a calculating method of three-dimensional image for each convex lens of a lens array in a thee-dimensional display device 4 by the present embodiment.

After determining a referential viewing distance from where respective two-dimensional image 3 behind respective convex lenses are viewed as a three-dimensional image, and determining a plane (a referential viewing area) located at the referential viewing distance where combined reproduced two-dimensional images can be viewed as the three-dimensional image, respective images behind respective convex lenses of the lens array are calculated according to the following steps. As depicted in FIG. 1, a referential viewing area 2 is divided into small areas as a two-dimensional M by N matrix in accordance with a resolution of the three-dimensional image to be reproduced.

First of all, a virtual object with opaque body is explained in order to simplify the explanation. 1) One small area is selected out of the divided referential viewing area; 2) A virtual object B to be displayed is searched (i.e., ray tracked) along a line D from a center C of the determined small area to a predetermined convex lens A; 3) Determine a point P which firstly reaches the object B, as a surface point of the object B; 4) Brightness and color at the point P of the object B are calculated based on surface color of the object B and a lighting condition, as if the point P of the object B is viewed from the center C of the small area; 5) The calculated brightness and color are determined as image data of a crossing point of the line D on a image recording means 11 (a photographic film) behind the lens A. Above-mentioned calculating steps on the determined lens A are repeated for all divided areas of M by N so that one image behind the lens A is completed.

Additional transmission and/or refraction data are calculated as portions of the image data of the point P, when the virtual object B is transparent or translucent and a refractory index of the object B is provided, and further when reflection on the surface of the object is required. If necessary, shading data is calculated as a part of the image data.

Figure 2A:
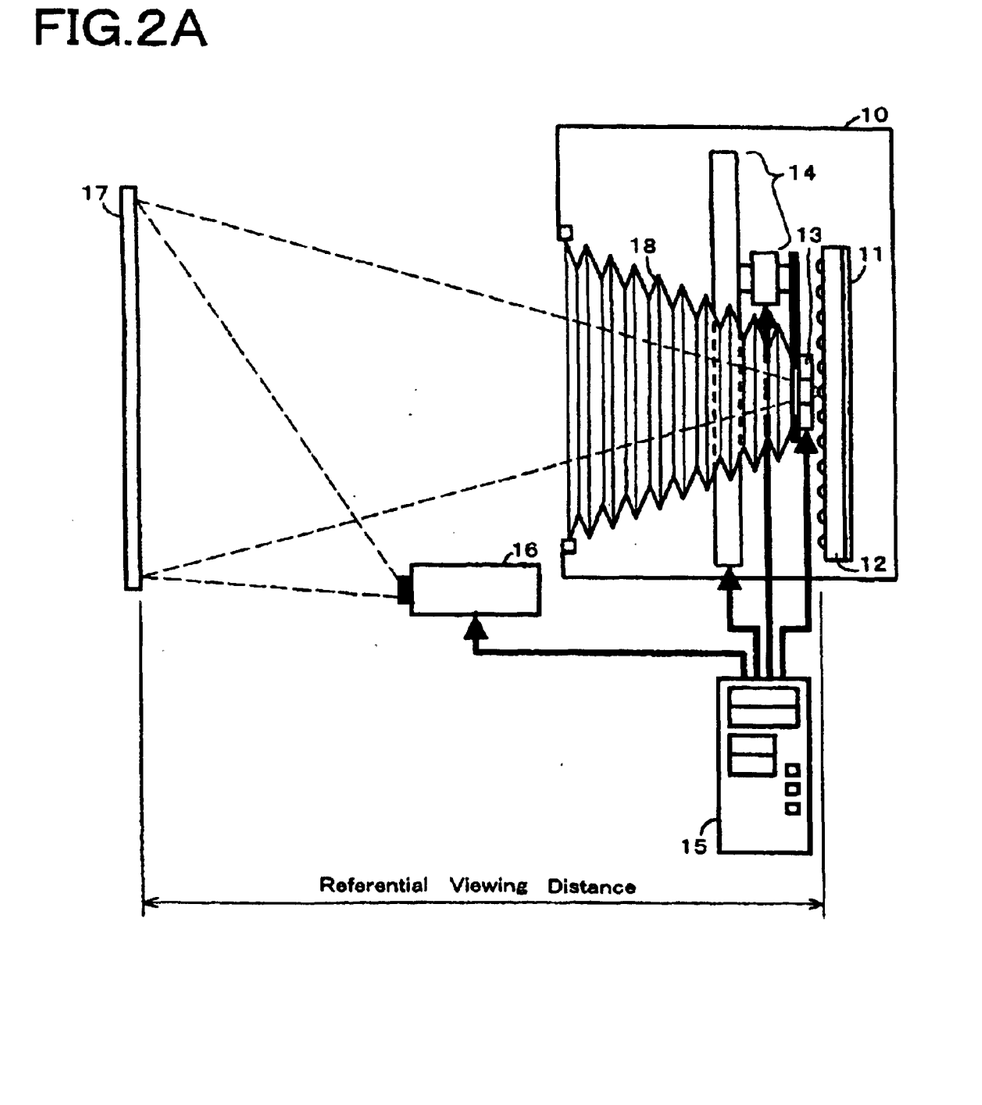
FIG. 2A is an elevation view depicting a rough constitution of a three-dimensional image generating device by the present invention.
Figure 2B:
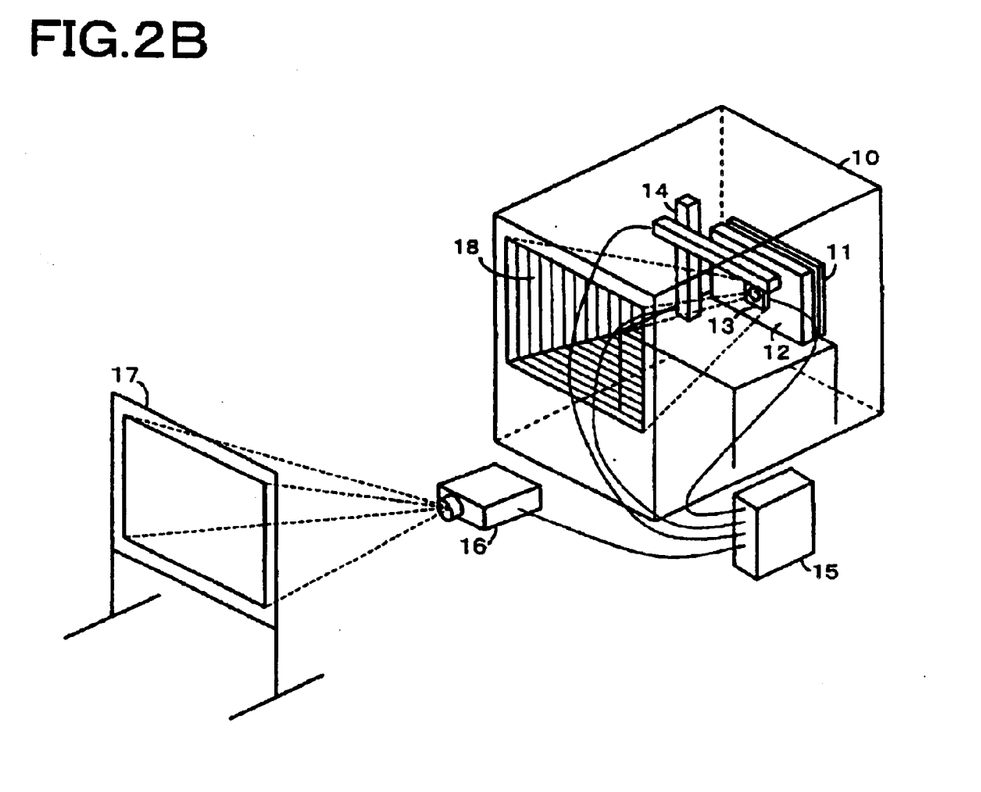
FIG. 2B is a perspective view of the device shown in FIG. 2A.

FIGS. 2A and 2B shows the rough constitution of the three-dimensional image generating device by the present invention. The three-dimensional image generating device comprises a lens array 12 having the predetermined number of convex lenses arranged in a matrix and an image recording means 11 (a photographic film) arranged behind the lens array (almost on a focal plane). The lens array 12 and the image recording means 11 are placed in a black box 10. The three-dimensional image generating device also comprises a shutter moving means 14 (i.e., an X-Y stage in FIG. 2B) equipped with a shutter 13 and a bellows 18. One end of the bellows 18 is fitted to around the shutter 13 and the other end is fitted to the black box 10. Except the lens directly behind the shutter 13, the other remaining lenses are always shielded from irradiated light from a screen 17, when the shutter 13 is moved by the shutter moving means 14. The shutter moving means 14 and the shutter are connected to a computer 15. An image projecting means 16 is connected to the computer 15 so that a calculated image by the computer 15 can be projected on the screen 17. The screen 17 are arranged apart from the lens array by a referential viewing distance of the three-dimensional image generating device.

Images, which are placed behind the respective convex lenses of the three-dimensional image generating device, are generated according to the following steps. The image recording means 11 (the photographic film) are placed near to the focal plane behind the lens array 12. The shutter moving means 14 is operated so as to move the shutter 13 in front of a desired convex lens. The corresponding image to the selected lens calculated by the above-mentioned steps, is read from a memory of the computer 15 and is projected on the screen 17 by the projecting means 16. A series of steps from the step of determining the desired convex lens by the shutter moving means 14 to the step of projecting the image, are automatically controlled by the computer 15. Only a portion of the recording means 11 behind the desired convex lens is exposed by opening the shutter 13. During a series of steps mentioned above, except the desired lens, other remaining convex lenses are covered by the black box 10 and the bellows 18 so that portions of the recording means corresponding the remaining lenses are not exposed.

The whole image is completed, when the above-mentioned series of steps are repeated on other remaining convex lenses. The X-Y stage and a robot arm with more than two joints can be employed as the shutter moving means for controlling a movement of the shutter 13 two-dimensionally and determining a position of the shutter 13, but not limited to these methods.

In the present embodiment, the bellows is employed for shielding light rays from the screen to other remaining lenses than the desired lens, but not limited to the above-mentioned method.

In place of the movable shutter employed in the above-mentioned embodiment, an optical window can be employed by controlling a displaying period on a two-dimensional display device placed in the vicinity of the referential viewing area as far as a proper light exposure on the image recording means 11 is obtained.

In the above-explained embodiment, the image recording means is exposed after the shutter is moved and stopped. However, when a high sensitive photographic film is employed as the image recording means 11, the shutter can be moved continuously without stopping and opened immediately when the shutter is positioned in front of the desired lens, since the high sensitive film can be exposed instantly. Also the optical window can be moved continuously as moving the shutter.

In the present embodiment, the projected images on the screen 17 are calculated beforehand and stored in the memory of the computer 15, but a calculated results can be directly projected on the screen.

Figure 5:
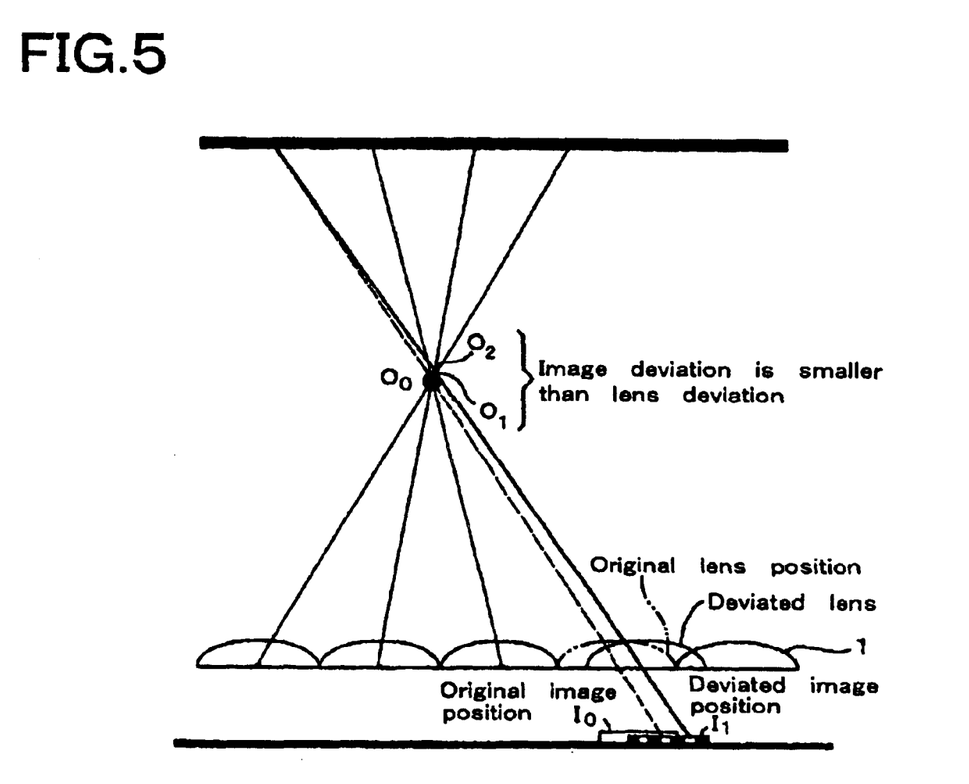
FIG. 5 is an explanatory diagram depicting a reproduced image from generated deviated image where the same deviated convex lens is utilized for generating and reproducing the image.
Figure 6:
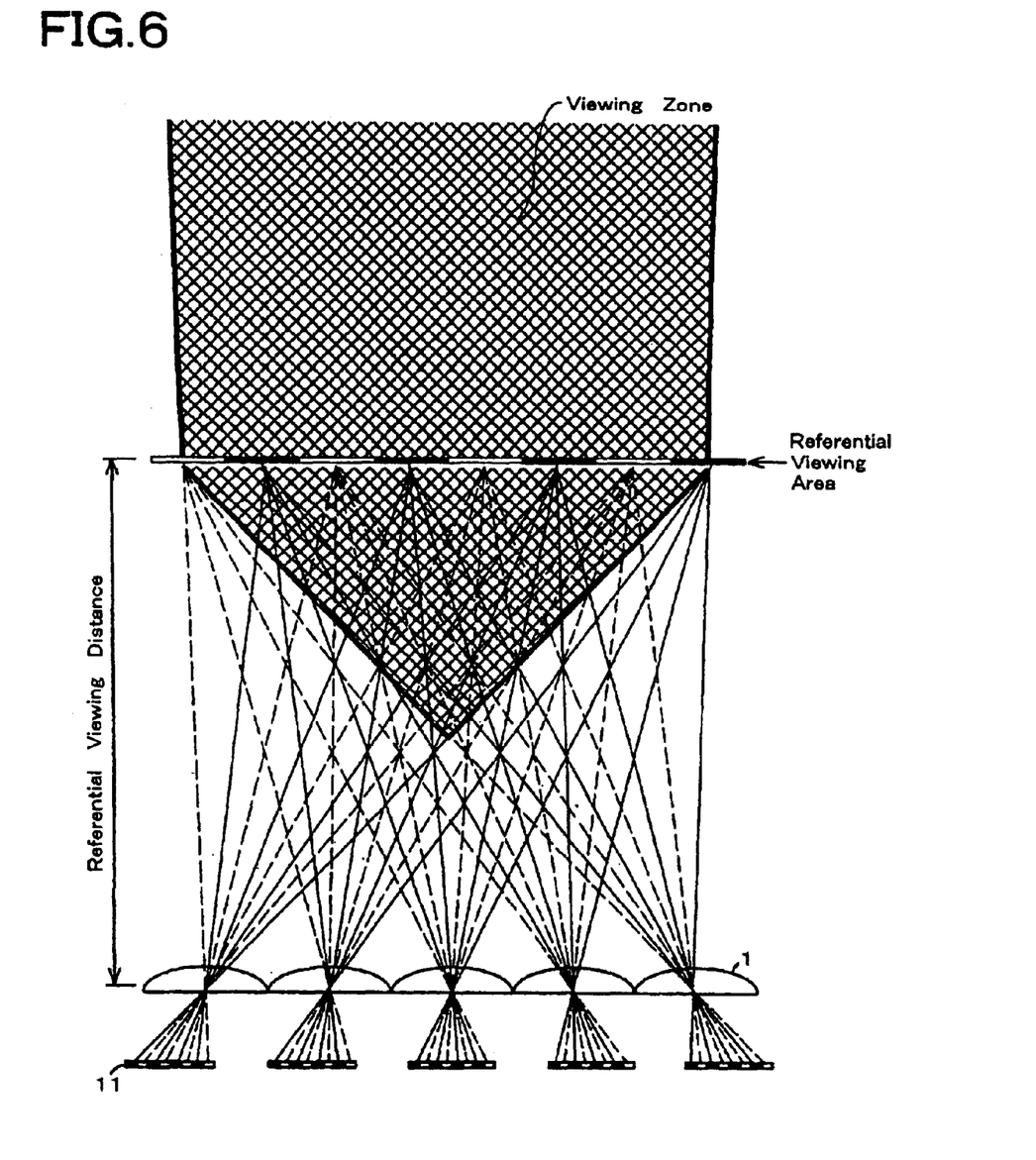
FIG. 6 is an explanatory diagram depicting a referential zone generated by the present invention.

When the whole images generated by the above-mentioned steps, is viewed through the lens array, the whole image is displayed as a three-dimensional image. In the present invention, the same lens array employed for generating images is employed for displaying the generated images. A generated image deviates from a designed position when some of lenses are deviated, but the images is reproduced at a virtually right position on the referential viewing plane, since the generated deviated image is reproduced as a compensated image by the same deviated lenses, which returns deviated light rays to designed positions in the referential viewing area (see FIG. 5). Since light rays scarcely deviated in a viewing zone (in the vicinity of the referential viewing area, the hatched area in FIG. 6), the present invention can attain a feature characterized by that a three-dimensional image is reproduced correctly in its position and geometry.

Hereinafter, a case where a lens in the lens array of the present invention is deviated from a designed position by 0.1 mm, is explained as mentioned in the conventional lens array, so that features of the present invention can be understood more clearly. In the present invention, since a deviated recorded image by the deviated image is reproduced by the same lens, it is guaranteed at least that light rays are returned to a position where a two-dimensional display device (i.e., the screen 17) was located at the referential viewing distance, even if the lens is deviated from the designed position by 0.1 mm. Consequently, light rays in the vicinity of the referential viewing area at the datum distance, are reproduced virtually without positional errors. Since three-dimensional images obtained by the image generating device are designed to be observed from the referential viewing area in the vicinity of the referential viewing distance (see FIG. 6), positional errors of light rays in the viewing zone are very small so that virtually positional deviations of the reproduced images are not felt. In the same manner, points of the three-dimensional image reproduced between the referential viewing area and the lens array are deviated smaller than the deviation of the lens and these points are converged almost into one point so that the resulted three-dimensional image consisting of the accumulated light rays from many lenses, is scarcely blurred (see points $O_0$, $O_1$ and $O_2$ in FIG. 5).

Although some of the lenses distorted, since recording ray tracks and reproducing ray tracks are reversible due to the fact that the same lenses are used in generating and reproducing images, reproducing ray tracks returning to the referential viewing area can compensate distortions in generated images.

In other words, even if deviations or distortions are generated in the generated images due to the deviated or distorted lenses, the deviations or the distortions are compensated by the deviated or distorted lenses when generated images are reproduced so that normal three-dimensional images can be displayed. Therefore, one of the significant features of the three-dimensional image generating method mentioned above is that accuracy and arranging errors of the lenses do not influence on the reproduced three-dimensional images.

As mentioned above, since generating images are calculated based on respective points in the referential viewing area, light rays in the vicinity of the referential viewing area are calculated with high precision. As a result, the three-dimensional image in a significant part of the referential viewing area consisting of the light rays can be displayed with precision. Even if deviations or distortions due to the deviated or distorted lenses are generated based on calculations by the computer, the deviations or the distortions are compensated by the deviated or distorted lenses when generated images are reproduced so that three-dimensional images with little deviations and distortions can be displayed.

The three-dimensional image displaying device and the three-dimensional image generating method constituted in the above-mentioned manners are capable of being utilized in various fields such as:
(1) Three-dimensional Display for Medicine;
(2) Outdoor Advertisement;
(3) Display for Exhibition;
and the like.

What is claimed is:

1. A three-dimensional image calculating method for calculating a plurality of images utilized in a three-dimensional image display device which comprises:
   a lens array having a predetermined number of convex lenses arranged in a matrix; and
   image display means for displaying a plurality of images corresponding to the respective convex lenses, wherein said method consists of steps of:
   assuming a referential viewing distance wherefrom a reproduced three-dimensional image is viewed;
   dividing a viewing zone positioned at said referential viewing distance (a referential viewing area) into small areas arranged in another matrix;
   ray tracking along a line connecting the center of said small area with a base point of a selected convex lens;

determining a first cross point of said line connected with said selected lens to surfaces of objects to be displayed as a three-dimensional image;

calculating image information on said first cross point;

repeating said calculating step on the whole convex lenses; and repeating steps from said ray tracking to just prior step to the present step on respective said small areas.

2. A three-dimensional image generating method for a three-dimensional image display device which comprises:

a lens array having the predetermined number of convex lenses arranged in a matrix;

image recording means behind respective convex lenses arranged nearly at the focal planes of said respective convex lenses;

a two-dimensional display means ahead of said lens array arranged at a predetermined distance from said lens array;

an optical window for reaching light rays from said two-dimensional display means to only one of plurality convex lenses;

a light ray shielding means for not reaching light rays from said two-dimensional display means to other remaining convex lenses except one;

an optical window moving means for holding said optical window and for moving said optical window two-dimensionally; and a sequence controlling means to control images calculated by the method of claim 1 for transferring to said two-dimensional display means and to control movements of said optical window moving means, wherein said method consists of steps of:

moving said optical window to a position corresponding to a determined convex lens by controlling said sequence controlling means and said optical window moving means;

transferring a calculated image corresponding to said determined convex lens to said two-dimensional image display means;

displaying said transferred image for a predetermined period;

exposing said displayed image on said image recording means via said optical window and said convex lens determined by said optical window;

repeating the above-mentioned series of steps on a next determined convex lens; and repeating the above-mentioned series of steps on the whole convex lenses of said lens array so as to complete the three-dimensional image.

3. The three-dimensional image generating method according to claim 2, wherein:

an optical shutter controlled by said sequence controlling means is added to said optical window, and an exposing time of said predetermined period is controlled by opening and shutting said shutter.

4. The three-dimensional image generating method according to claim 2, wherein:

said recording means is a photographic film.

5. A three-dimensional image display device comprising:

a lens array having the predetermined number of convex lenses arranged in a matrix; and image display means for displaying a plurality of images calculated by the method of claim 1 corresponding to the respective said convex lenses, wherein:

said lens array is the same lens array employed for generating images by the method of claim 1.

* * * * *

UNITED STATES PATENT AND TRADEMARK OFFICE
CERTIFICATE OF CORRECTION

PATENT NO. : 6,909,552 B2
DATED : June 21, 2005
INVENTOR(S) : Takeyoshi Dohi et al.

It is certified that error appears in the above-identified patent and that said Letters Patent is hereby corrected as shown below:

Column 6,
Lines 66-67, change "said small area" to read -- one of said small areas --.

Column 7,
Line 5, change "the whole" to read -- all of the --.
Line 7, after "repeating" and before "just" insert -- the -- (two places).
Line 11, change "the" to -- a --.
Line 14, after "behind" insert -- the --.
Line 20, change "reaching" to -- passing --.
Line 21, delete "plurality" and replace with -- predetermined number of --.
Line 23, change "not reaching" to -- blocking --.
Line 24, change "other" to -- the --.
Line 25, after "except" change "one" to read -- the one convex lens of the predetermined number --.

Column 8,
Line 15, delete "whole".

Signed and Sealed this

Twentieth Day of September, 2005

JON W. DUDAS
*Director of the United States Patent and Trademark Office*